United States Patent [19]

Hidaka

[11] Patent Number: 4,870,828
[45] Date of Patent: Oct. 3, 1989

[54] COOLING SYSTEM IN MOTOR VEHICLE

[75] Inventor: Yoshiaki Hidaka, Tokyo, Japan

[73] Assignee: Nihon Radiator Co., Ltd., Tokyo, Japan

[21] Appl. No.: 155,731

[22] Filed: Feb. 16, 1988

[30] Foreign Application Priority Data

Feb. 25, 1987 [JP] Japan .................................. 62-40167

[51] Int. Cl.$^4$ ...................... F25B 19/00; F02M 15/00; F02M 31/20; F02M 53/00
[52] U.S. Cl. ............................................ 62/7; 62/169; 62/268; 123/541; 123/514; 123/519; 165/41
[58] Field of Search ............... 123/540, 541, 542, 514, 123/519; 62/169, 170, 224, 268, 270, 371, 514 R, 7; 165/41

[56] References Cited

U.S. PATENT DOCUMENTS

| | | | |
|---|---|---|---|
| 2,136,527 | 11/1938 | Stelzer | 62/169 |
| 2,233,249 | 2/1941 | Downs | 62/169 |
| 2,359,219 | 4/1944 | Jones | 62/7 |
| 2,755,639 | 7/1956 | Straznicky | 62/7 |
| 2,872,790 | 2/1959 | Simpson et al. | 62/268 |
| 2,908,143 | 10/1959 | Price | 62/7 |
| 2,994,311 | 8/1961 | Shuck | 123/541 |
| 3,306,056 | 2/1967 | Kennedy | 62/7 |
| 3,648,480 | 3/1972 | Watts | 62/268 |
| 3,973,536 | 8/1976 | Zelders | 123/541 |

FOREIGN PATENT DOCUMENTS 59-48220 3/1984 Japan .

Primary Examiner—John Ford
Attorney, Agent, or Firm—Foley & Lardner, Schwartz, Jeffery, Schwaab, Mack, Blumenthal & Evans

[57] ABSTRACT

Herein disclosed is a cooling system for use with an internal combustion engine which is operated on evaporable fuel supplied from a fuel tank. The cooling system comprises a tube extending from the fuel tank to a venturi throat portion of an air induction passage of the engine, an expansion valve connected to the tube and opening the tube when a pressure in the tube downstream of the valve is reduced to a certain degree, an evaporator device connected to the tube at a position downstream of the expansion valve, and a structure for defining an enclosed space about the evaporator device.

9 Claims, 4 Drawing Sheets

COOLING SYSTEM IN MOTOR VEHICLE

BACKGROUND OF THE INVENTION

1. Field of the Invention

The present invention relates in general to a cooling system equipped in a motor vehicle, and more particularly to a cooling system which is powered by a vacuum created in an air induction part of an internal combustion engine of the vehicle.

2. Description of the Prior Art

Nowadays, some passenger motor vehicles are equipped with a cooler box for cooling any goods, such as fruits, juice cans, wet towels and the like. Usually, the cooler boxes hitherto proposed are of a type which is powered by an automotive air conditioner equipped in the motor vehicle.

One of the cooling systems for such conventional cooler boxes is disclosed in Japanese Patent First Provisional Publication No. 59-48220, which, as is shown in FIG. 5 of the accompanying drawings, is arranged in a bypass circuit "C" of a known passenger room cooling system "A". The passenger room cooling system "A" comprises generally a compressor 10 driven by the engine of the vehicle for compressing a coolant, a condenser 12 for condensing and thus liquidizing the coolant from the compressor 10, an expansion valve 14 which opens when the pressure in the coolant line upstream of the expansion valve 14 comes to a predetermined degree, and an evaporator 16 for evaporating the coolant from the expansion valve 14. The coolant from the evaporator 16 is returned to the compressor 10 for recirculation of the coolant in the system "A". Due to heat exchange carried out at the evaporator 16, air blown into the passenger room is cooled. Although not shown in the drawing, a heater unit is usually provided near the evaporator 16 to constitute an air conditioning system.

The cooling system for the cooling box "B" comprises an auxiliary expansion valve 18 into which a part of the coolant from the condenser 12 is fed, and an auxiliary evaporator 20 for evaporating the coolant from the expansion valve 18. The coolant discharged from the evaporator 20 is returned to the compressor 10. The cooling box "B" is arranged to house therein the auxiliary evaporator 20, so that under flowing of the coolant in the bypass circuit "C", the interior of the cooler box "B" is cooled.

However, due to its inherency in construction, the cooling system of the cooler box "B" of the above-mentioned type can not operate when the room cooling system "A" is in its OFF condition. That is, the operation of the cooler box cooling system is only available when the room cooling system is ON condition. This is very disadvantageous when considering a usage of the cooler box "B" in winter. In fact, in winter, there is no need of operating the room cooling system "A".

SUMMARY OF THE INVENTION

It is therefore a first object of the present invention to provide a cooling system for use in a motor vehicle, which is free of the above-mentioned drawback.

It is a second object of the present invention to provide a cooling system for use in a motor vehicle, which can operate independent of the passenger room cooling system.

It is a third object of the present invention to provide a cooling system for use in a motor vehicle, which is powered by a vacuum created in the air induction part of an internal combustion engine mounted on the vehicle.

It is a fourth object of the present invention to provide a cooling system of a cooler box for use in a motor vehicle, which is simple in construction.

It is a fifth object of the present invention to provide a cooling system by which undesirable vapor lock and percolation phenomena of an internal combustion engine of the vehicle are suppressed.

It is a sixth object of the present invention to provide a cooling system by which the escape of fuel vapors from the fuel tank through a canister is effectively suppressed.

According to the present invention, there is provided a cooling system for use with an internal combustion engine which is operated on evaporable fuel supplied from a fuel tank through a fuel supply line. The cooling system comprises a tube extending from the fuel tank to a given portion of an air induction part of the engine where a considerable vacuum is produced under operation of the engine; an expansion valve connected to a part of the tube, the expansion valve opening the tube when a pressure in the tube downstream of the valve is reduced to a certain degree; an evaporator device connected to the tube at a position downstream of the expansion valve; and means for defining an enclosed space about the evaporator device.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
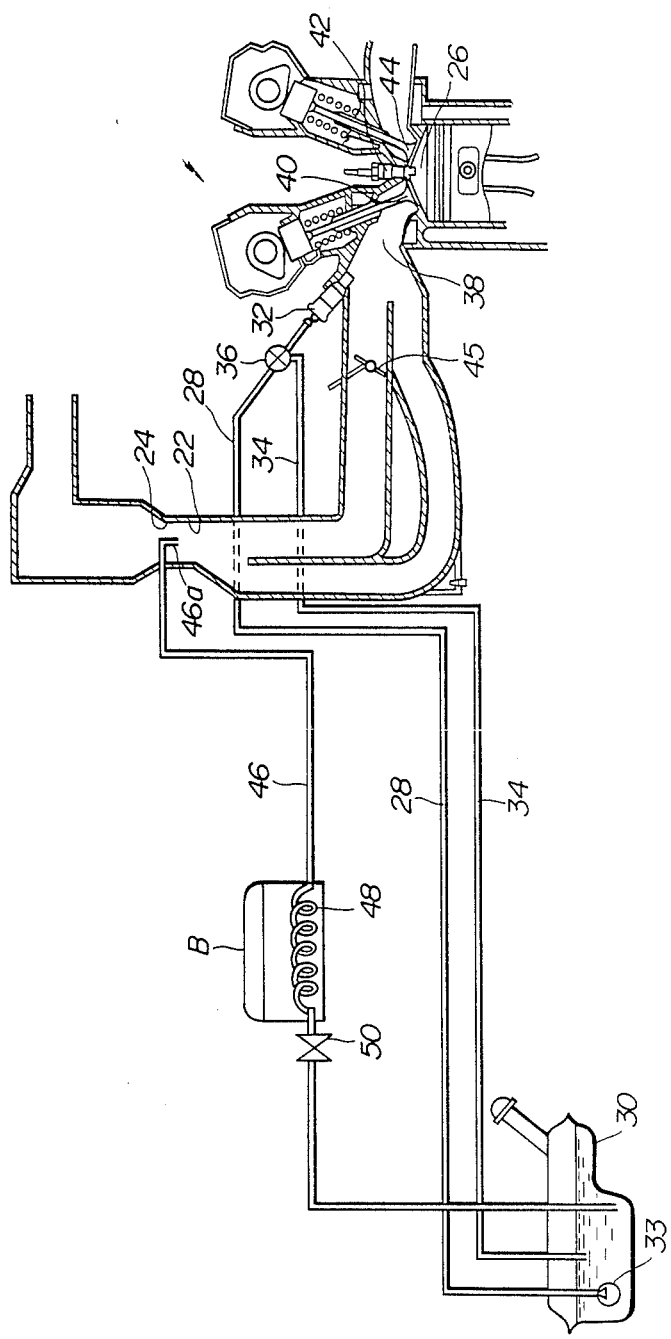
FIG. 1 is a schematic illustration of a first embodiment of the present invention, which is a cooling system for a cooler box installed in a motor vehicle.

Referring to FIG. 1 of the drawings, there is shown a first embodiment of the present invention, which is a cooling system for a cooler box mounted on a motor vehicle.

The cooling system of the invention is powered by a vacuum created in an air induction part of an internal combustion engine "E". For producing a considerable vacuum, the engine "E" has at an air induction passage 22 thereof a venturi throat portion 24. A fuel supply line 28 extends from a fuel tank 30 to fuel injection valves 32 (only one is shown). A fuel pump 33 is fixed to the inlet of the fuel supply line 28 at the position in the fuel tank 30. A fuel return line 34 extends from a downstream part of the fuel supply line 28 through a pressure regulator valve 36 and leads to the fuel tank 30. The fuel injection valves 32 are projected into a manifold runner 38 just upstream of intake valves 40 (only one is shown). Designated by numerals 42 and 44 are spark plugs and exhaust valves respectively. Designated by numeral 45 is a throttle valve which controls the amount of air fed to the combustion chambers 26 of the engine "E".

Under operation of the engine "E", air is fed into a combustion chamber 26 through the air induction passage 22. During flowing of air through the induction passage 22, the speed of flow is increased at the venturi throat portion 24, and air pressure is decreased.

Projected into the interior of the venturi throat portion 24 is one end 46a of a tube 46 which extends to the fuel tank 30 through an evaporator 48 and an expansion valve 50. As is shown in the drawing, the other end of the tube 46 is deeply submerged in the fuel tank 30. The evaporator 48 is housed in a cooler box B which is arranged in a passenger room of the vehicle. The expansion valve 50 functions to quickly open the line 46 when the vacuum in the line 46 downstream of the valve 50 becomes to a predetermined degree under operation of the engine "E". Thus, upon opening of the expansion valve 50, fuel from the fuel tank 30 is jetted into the evaporator 48 where the fuel is quickly evaporated. During this, the fuel absorbs heat from the surrounding thereby cooling the interior of the cooler box B. It is to be noted that any fuel (namely, fuel vapor) sucked into the venturi throat portion 24 through the tube 46 is carried by the induction air and burnt in the combustion chambers 26 of the engine "E".

From the stand point of safety, the evaporator 48 may be arranged on an outside of the passenger room. In this case, a heat pipe is used for transferring heat between the evaporator and a cooler box which is mounted in the passenger room.

Furthermore, if desired, an electronically operated fuel control system may be applied to the engine "E" for optimally controlling the amount of fuel injected by the fuel injector valves 32 by monitoring the amount of fuel supplied by the tube 46. One measure for achieving this operation is to control the pressure regulator valve 36 in a manner to equalize the pressure in the fuel injection valves 32 and that in the manifold runner 38.

Figure 2:
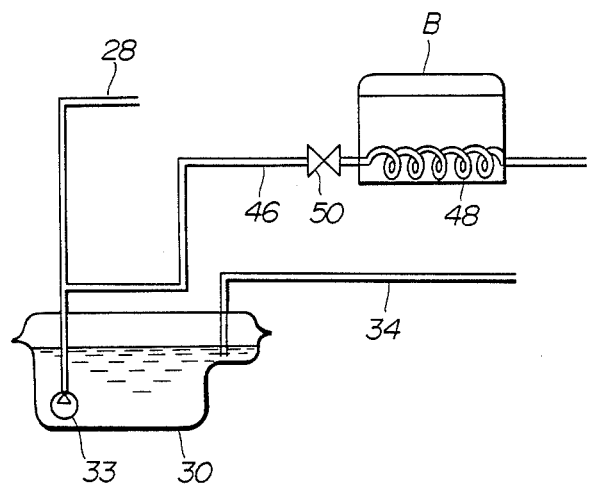
FIG. 2 is a partial view showing a modification of the first embodiment of FIG. 1.
Figure 5:
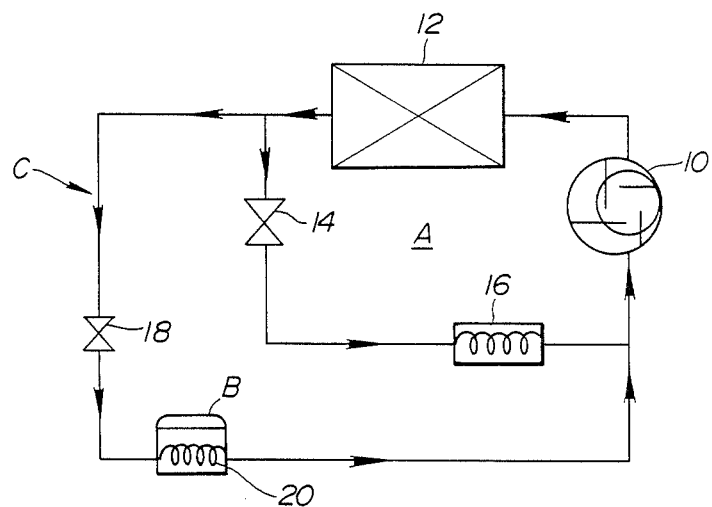
FIG. 5 is a diagram showing a conventional cooling box cooling system powered by a passenger room cooling system.

Referring to FIG. 2, there is shown a modification of the first embodiment of FIG. 1. In this modification, the tube 46 of the cooler box cooling system is branched out the fuel supply line 28.

Figure 3:
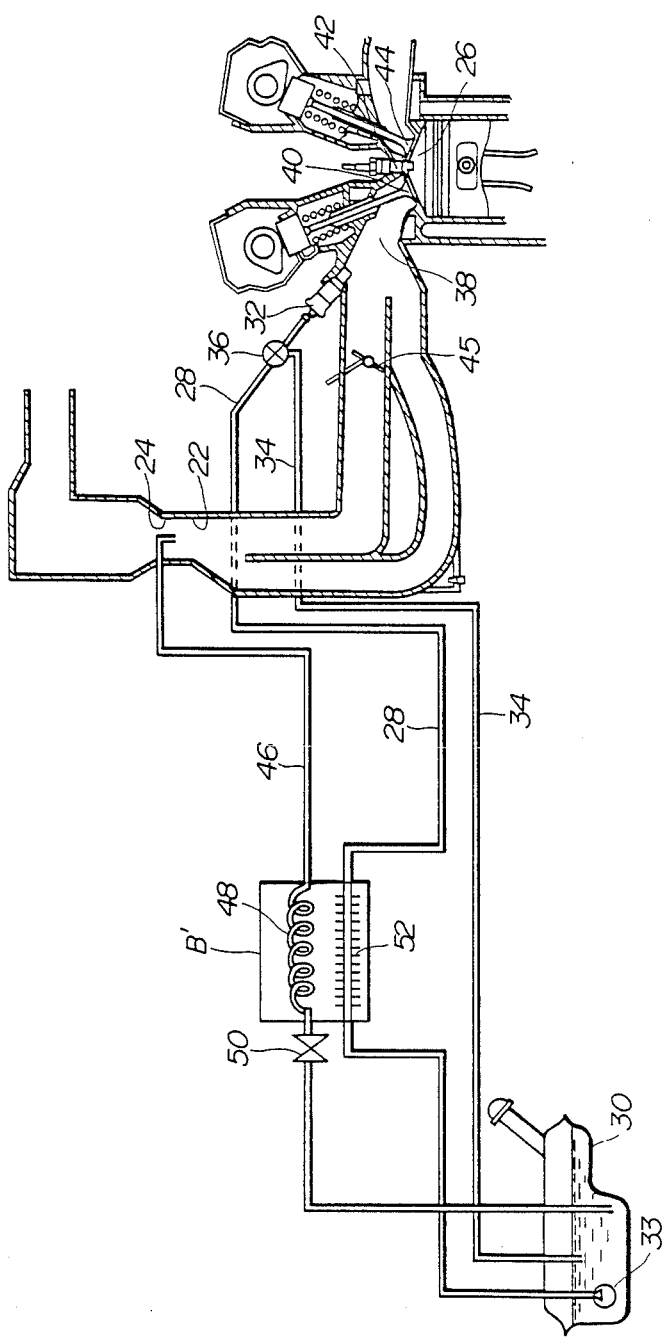
FIG. 3 is a view similar to FIG. 1, but showing a second embodiment of the present invention, which is a cooling system for a fuel supply line of an internal combustion engine.

Referring to FIG. 3, there is shown a second embodiment of the present invention, which is a cooling system for the fuel supply line 28.

In the second embodiment, the evaporator 48 is housed in a box structure "B" fixed to the vehicle body, and a part of the fuel supply line 28 is exposed to the interior of the box structure "B". As shown, fins 52 are fixed to the exposed part of the line 28 for achieving assured heat exchange between the line 28 (viz., fuel in the line) and the interior of the box structure. If desired, the exposed part of the line 28 may be wound around the evaporator 48 in the box structure "B".

During operation of the engine "E", the interior of the box structure "B" is cooled for the reason which has been described hereinafore. The fuel flowing through the fuel supply line 28 is thus cooled thereby suppressing or at least minimizing the undesirable vapor lock and percolation phenomena of the engine "E".

Figure 4:
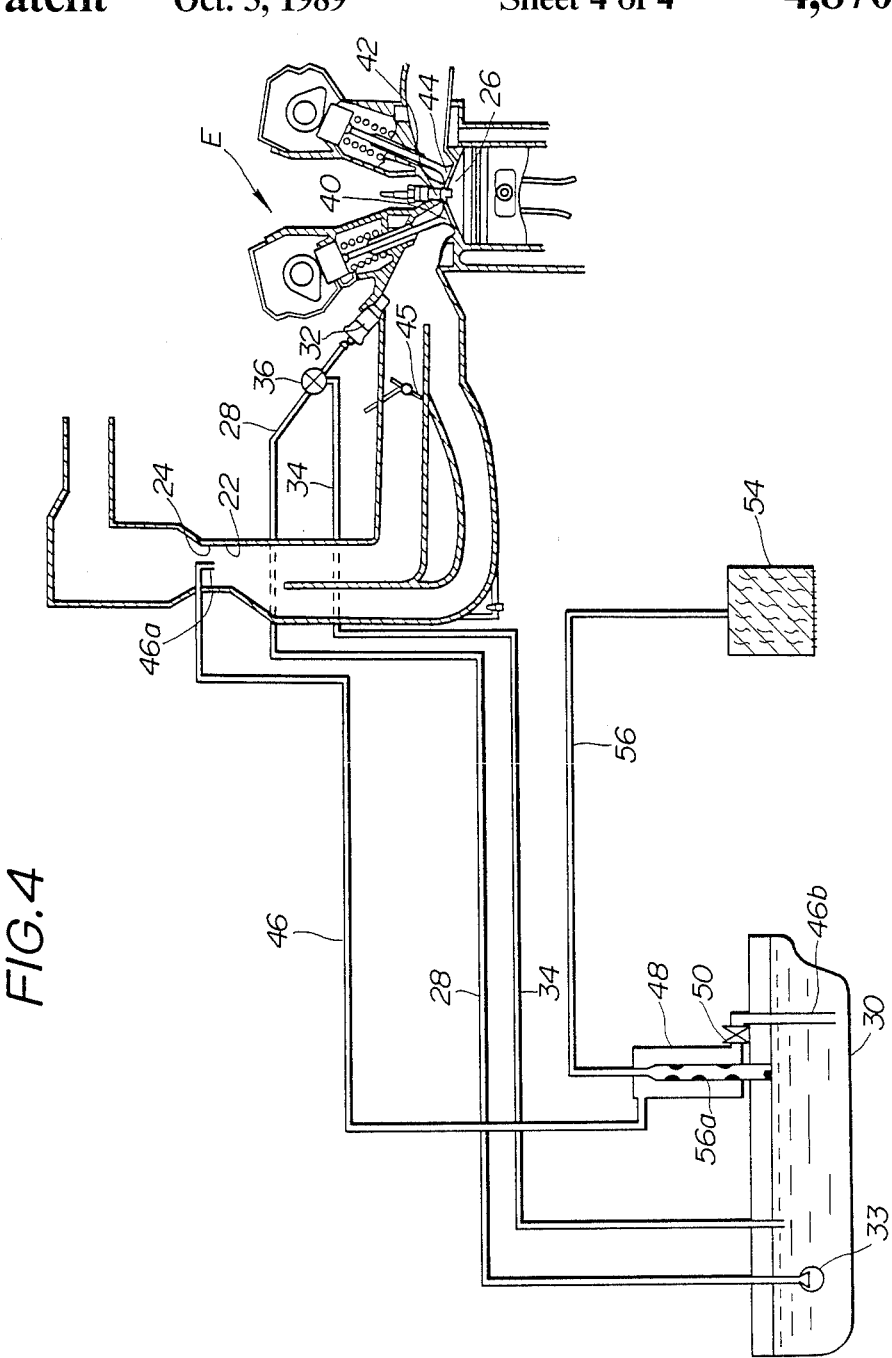
FIG. 4 is a view similar to FIG. 1, but showing a third embodiment of the present invention, which is a cooling system applied to a vapor transmission line to a canister.

Referring to FIG. 4, there is shown a third embodiment of the present invention, which is a cooling system for use in an evaporative emission control system. The emission control system comprises a carbon canister 54 to which a vapor transmitting tube 56 from the fuel tank 30 is connected. Fuel vapors produced in the fuel tank 30 are trapped by the canister 54. However, as is known, when vapor absorbing ability of the canister 54 becomes saturated, the vapors from the fuel tank 30 escape to the open air through the saturated canister 54. The third embodiment is provided for suppressing saturation of the vapor absorbing ability of the canister.

That is, in the third embodiment, an evaporator 48 in the form of a box is arranged to house therein a fuel vapor induction part 56a of the vapor transmitting tube 56. One end of the evaporator 48 is connected to the tube 46 which leads to the venturi throat portion 24, and the other end of the evaporator 48 is connected through an expansion valve 50 to a short tube 46b which is deeply immersed in the fuel of the fuel tank 30, as shown. Thus, during operation of the engine "E", the interior of the box-like evaporator 48 is cooled and thus the vapor induction part 56a of the tube 56 is cooled, so that fuel vapors in the part 56a are condensed and liquidized and thus gradually drop into the fuel tank 30. This phenomenon reduces the amount of fuel directed to the canister 54 thereby elongating the life or saturation period of the same.

What is claimed is:

1. A cooling system for use with a fuel injected engine which is operated on evaporable fuel supplied from a fuel tank through a fuel supply line to at least one fuel injection valve, said cooling system comprising:
   a tube extending from said fuel tank to a given portion of an air induction part of the engine where a vacuum is produced under operation of the engine;
   said tube having a nozzle portion extending into an exterior of said given portion;
   an expansion valve connected to a part of said tube between said fuel tank and said nozzle portion, said expansion valve opening the tube when a pressure in the tube downstream of the valve is reduced to a certain degree;
   an evaporator device connected to said tube between said expansion valve and said nozzle portion; and
   means for defining an enclosed space about said evaporator device;
   a fuel return line to return a portion of the fuel to the fuel tank during operation of the engine; and
   a pressure regulator valve connecting the return line to the fuel supply line for controlling the amount of fuel supplied to the engine.

2. A cooling system as claimed in claim 1, in which said given portion is a venturi throat portion formed in said air induction part of the engine.

3. A cooling system as claimed in claim 2, in which an intake end of said tube is immersed in the fuel in the fuel tank and extends substantially to the bottom of said fuel tank.

4. A cooling system as claimed in claim 3, in which said means for defining an enclosed space is a cooler box which is mounted in a passenger room of a motor vehicle on which said engine is mounted.

5. A cooling system as claimed in claim 3, in which said enclosed space defining means is a box structure through which a part of said fuel supply line passes.

6. A cooling system as claimed in claim 5, in which said box structure is arranged outside of a passenger room of a motor vehicle on which said engine is mounted.

7. A cooling system as claimed in claim 3, in which said enclosed space defining means is a vessel structure of said evaporator device, in which an induction part of a tube extending to a carbon canister is spacedly received, and in which said induction part is exposed to a fuel vapor space defined in said fuel tank.

8. The cooling system according to claim 1, further comprising:
   a manifold portion which communicates with said air induction part of the engine and receives fuel from said fuel injection valve; and
   means for controlling the amount of fuel present in the manifold portion by monitoring the amount of fuel supplied by said nozzle portion and controlling the amount of fuel injected by said fuel injection valves.

9. The cooling system according to claim 1, further comprising:
   a manifold portion which communicates with said air induction part of the engine and receives fuel from said fuel injection valve; and
   means for controlling said pressure regulator valve to equalize the pressure in said fuel injection valve and said manifold portion.

* * * * *